US012600244B2

(12) United States Patent
Randall et al.

(10) Patent No.: US 12,600,244 B2
(45) Date of Patent: Apr. 14, 2026

(54) CONTROL FEATURE TO OPTIMIZE BATTERY STATE OF CHARGE BY UTILIZING RESISTOR GRID

(71) Applicant: Caterpillar Inc., Peoria, IL (US)

(72) Inventors: Jacob Dean Randall, Peoria, IL (US); Dennis Christopher Agee, Newark, TX (US)

(73) Assignee: Caterpillar Inc., Peoria, IL (US)

( * ) Notice: Subject to any disclaimer, the term of this patent is extended or adjusted under 35 U.S.C. 154(b) by 217 days.

(21) Appl. No.: 18/507,692

(22) Filed: Nov. 13, 2023

(65) Prior Publication Data
US 2025/0153579 A1 May 15, 2025

(51) Int. Cl.
| *H02P 1/00* | (2006.01) |
| *B60L 7/10* | (2006.01) |
| *B60L 15/20* | (2006.01) |
| *B60L 58/12* | (2019.01) |

(52) U.S. Cl.
CPC ............ *B60L 15/2018* (2013.01); *B60L 7/10* (2013.01); *B60L 58/12* (2019.02); *B60L 2200/36* (2013.01); *B60L 2200/44* (2013.01); *B60L 2240/54* (2013.01)

(58) Field of Classification Search
CPC .. H02P 1/40; H02P 27/06; H02P 27/08; H02P 29/0241; H02P 3/12; B60L 15/2018
See application file for complete search history.

(56) References Cited

U.S. PATENT DOCUMENTS

| | | | |
|---|---|---|---|
| 7,325,498 B2 | 2/2008 | Kumar et al. | |
| 8,700,283 B2 | 4/2014 | Lammers | |
| 8,708,083 B2 | 4/2014 | Dewis et al. | |
| 9,274,540 B2 * | 3/2016 | Anglin | G06Q 10/02 |
| 10,065,627 B2 | 9/2018 | Oldridge | |
| 2018/0111496 A1 | 4/2018 | Cholewa et al. | |
| 2021/0086652 A1 * | 3/2021 | Follen | B60W 20/12 |

FOREIGN PATENT DOCUMENTS

| | | | | |
|---|---|---|---|---|
| CN | 116190834 A | * | 5/2023 | .......... H01M 10/486 |
| JP | 4686394 B2 | | 5/2011 | |
| JP | 2017-159711 A | | 9/2017 | |
| WO | 2022194357 A1 | | 9/2022 | |

* cited by examiner

*Primary Examiner* — Karen Masih
(74) *Attorney, Agent, or Firm* — Foley & Lardner LLP (Dallas)

(57) ABSTRACT

Provided herein is an electric drive machine including a battery having a state of charge ranging from a depleted state to a full state; a resistor grid electrically coupled to the battery; and a control circuit comprising one or more processors and a memory structured to store instructions that, when executed by the one or more processors, cause the control circuit to: determine the state of charge of the battery; determine a target state of charge of the battery according to an anticipated charge event; and control a flow of electrical current from the battery to the resistor grid, to modify the state of charge of the battery to the target state of charge, prior to the anticipated charge event.

20 Claims, 10 Drawing Sheets

610    Determine a state of charge of a battery

640    Determine ambient air temperature/pressure

620    Determine a target state of charge for the battery

600

630    Control a flow of electrical current from the battery to a resistor grid

CONTROL FEATURE TO OPTIMIZE BATTERY STATE OF CHARGE BY UTILIZING RESISTOR GRID

BACKGROUND

The present disclosure relates generally to the field of the operation of electrical drive machines.

SUMMARY

A first aspect provided herein relates to an electric drive machine. In various embodiments, the electric drive machine includes: a battery having a state of charge ranging from a depleted state to a full state; a resistor grid electrically coupled to the battery; and a control circuit comprising one or more processors and a memory structured to store instructions that, when executed by the one or more processors, cause the control circuit to: determine the state of charge of the battery; determine a target state of charge of the battery according to an anticipated charge event; and control a flow of electrical current from the battery to the resistor grid, to modify the state of charge of the battery to the target state of charge, prior to the anticipated charge event.

In some embodiments, the control circuit is configured to determine a state of charge differential according to two or more of the state of charge, the target state of charge, the depleted state, and the full state. In some embodiments, the determination of the target state of charge is also made according to the full state, the depleted state, or the charge differential. In some embodiments, the state of charge differential is the difference between the state of charge of the battery and the target state of charge of the battery.

In various embodiments, the electric drive also includes a motor in electrical communication with the resistor grid such that the resistor grid is configured to provide resistive braking to the electric drive machine during operation. In some embodiments, the motor is further configured to provide an electrical charge to the battery during the anticipated charge event. In some embodiments, the anticipated charge event is a downhill haul event during which the electric drive machine traverses a downward slope. In some embodiments, the control circuit is configured to determine the target state of charge according to an amount of electrical charge that the motor is anticipated to provide during the downhill haul event.

In various embodiments, the control circuit's control the flow of electrical current to the resistor grid causes a reduction in the state of charge of the battery by dissipation of a portion of the electrical current as heat through the resistor grid. In some embodiments, the determination of the state of charge of the battery is performed according to a measured state of charge of the battery, a computational model of the state of charge of the battery, or a combination thereof.

In various embodiments, the control circuit of the electric drive machine is configured to determine the target state of charge in response to: a signal from an operator of the electric drive machine, an elevation of the electric drive machine, an ambient air temperature, an ambient air density, a grade on which the electric drive machine is operated, the cooling load of the resistor grid, or a combination of two or more thereof.

A second aspect described herein relates to a method of controlling an electric drive machine. In various embodiments, the method includes: determining, by one or more processors, the state of charge of a battery; determining, by the one or more processors, a target state of charge of the battery according to an anticipated charge event; and controlling, by the one or more processors, a flow of electrical current from the battery to a resistor grid, to modify the state of charge of the battery to the target state of charge, prior to the anticipated charge event.

In some embodiments, a motor is in electrical communication with the battery and the resistor grid, wherein the anticipated charge event is a downhill haul event, and wherein the motor is configured to provide an electrical charge to the battery during the anticipated charge even. In some embodiments, controlling the flow of electrical current from the battery to a resistor grid reduces the state of charge of the battery prior to the downhill haul event. In some embodiments, the reduction in the state of charge of the battery is by dissipation of a portion of the electrical current as heat through the resistor grid.

In some embodiments, the method includes determining, by the one or more processors, the target state of charge according to an amount of electrical charge that the motor is anticipated to provide during the downhill haul event.

A third aspect disclosed herein relates to a method of operating an electric drive machine. In various embodiments, the method includes: measuring an electrical potential of a battery; determining, by one or more processors, a state of charge of a battery according to the measured electrical potential of the battery; determining, by the one or more processors, a target state of charge of the battery according to an anticipated charge event; and discharging a portion of an electrical charge contained by the battery through a resistor grid, thereby reducing the state of charge of the battery to the target state of charge.

In some embodiments, the method includes charging the battery by providing electrical charge to the battery during the downhill haul event. In some embodiments, the method includes providing resistive braking to the electric drive machine by providing electrical charge to the resistor grid during the downhill haul event. In some embodiments, the resistor grid converts the discharged electrical charge into heat.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Electric Drive Machine

Figure 1:
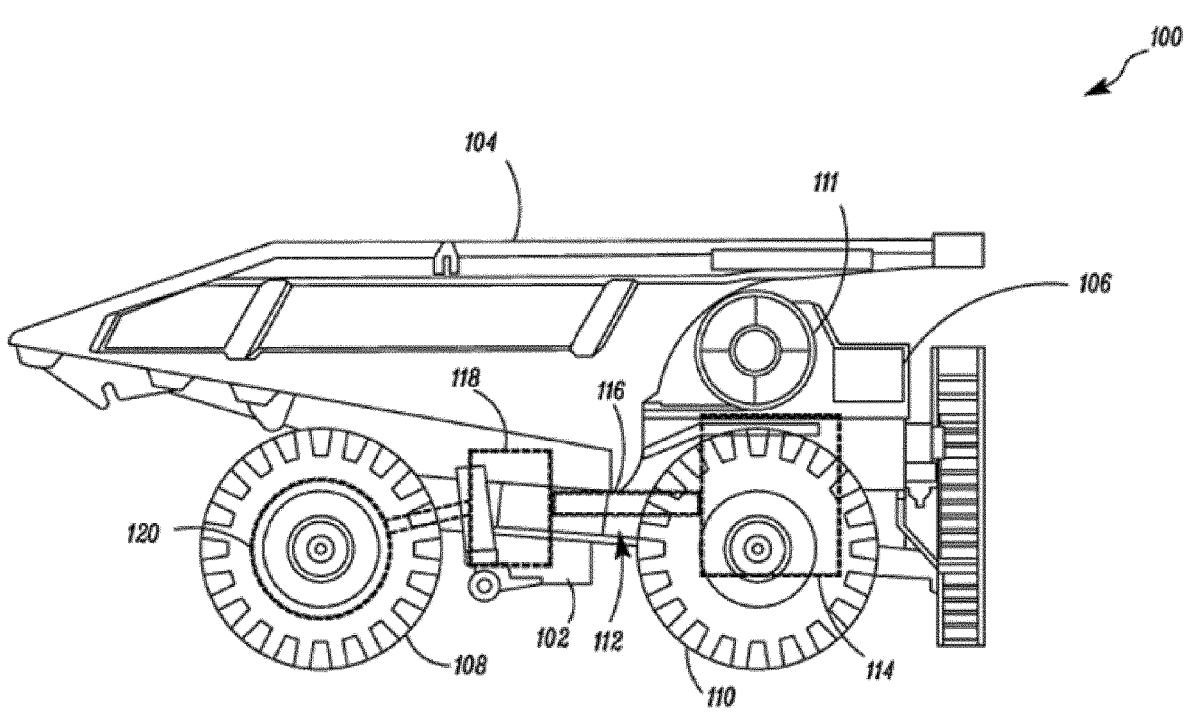
FIG. 1 is a side view of a machine, according to an embodiment of the present disclosure.

A machine 100 in which disclosed embodiments may be implemented is schematically illustrated in FIG. 1. The machine 100 may be generically described as any machine having an electric drive which may be connected to one or more drive wheels. The machine 100 may include a vehicle such as a diesel engine locomotive, a subway tram, an off-highway truck or a vehicle used in mining, construction, quarrying, and other applications. However, it will be apparent, any other vehicle having an electric drive or an electric-only arrangement may be included in the machine 100.

For the purpose of the present disclosure, in FIG. 1, the machine 100 is illustrated as an off-highway truck. The machine 100 may include a chassis 102 to support various components of the machine 100. The machine 100 may include a dump body 104 supported on the chassis 102. The chassis 102 may further support an operator cab 106 defined as an enclosure. An operator occupying the operator cab 106 may control various functions of the machine 100 by issuing various operator commands by means of controls such as a joystick, a lever, a touch-based user interface, or the like.

The machine 100 may further include a set of drive wheels 108 to propel the machine 100. In an embodiment, a set of idle wheels 110 may also be provided to steer the machine 100 in different directions. Further, the machine 100 may also include an articulated chassis for steering. Together, the set of drive wheels 108 and the set of idle wheels 110 may act as the ground engaging members for the machine 100. As illustrated in FIG. 1, the machine 100 also includes a modular resistor grid system 111 positioned adjacent to the operator cab 106 in the machine 100. However, it may be apparent, the modular resistor grid system 111 may be positioned anywhere based on the design and the available space in the machine 100.

The machine 100 of the present disclosure may be an electric machine having an electric drive 112. The electric drive 112 may provide the electric power to drive various components in the machine 100. In an embodiment, the electric power may be generated onboard by a generator, alternator, or another power-generation device, which may be driven by an engine or any other power source. Alternatively, the electric power may not be generated onboard but supplied externally from an overhead conductor via a pantograph trolley, a battery, a series of capacitors, or the like to drive the machine 100.

In the illustrated embodiment, the electric drive 112 includes a power source 114, which may be an engine, for example, an internal combustion engine such as a diesel engine, a gasoline engine, a natural gas engine or the like. The power source 114 may provide an output torque at an output shaft 116 in the machine 100. The output shaft 116 may be connected to a generator 118, which may be a multiple-phase alternating current (AC) synchronous alternator. During operation, the output shaft 116 rotates a rotor of the generator 118 to produce electric power, for example, in the form of alternating current (AC). This generated electric power may be used to run a plurality of drive motors 120 coupled directly or via intermediate assemblies to the set of drive wheels 108. For the purpose of the present disclosure, the drive motors 120 may be variable speed, reversible AC motors.

Electric Drive and Dynamic Breaking System

Figure 2:
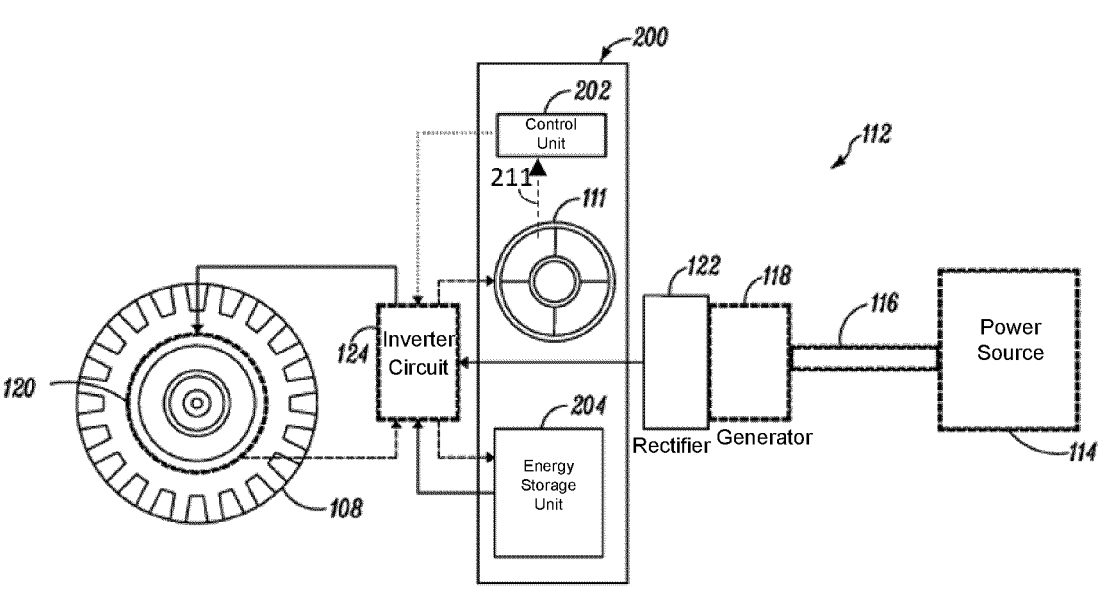
FIG. 2 is a schematic diagram of an electric drive for the machine of FIG. 1, according to an embodiment.

A schematic of the electric drive 112 is illustrated in FIG. 2. The electric drive 112 of the present disclosure may be a direct series drive. FIG. 2 illustrates an arrangement of various components of the electric drive 112 in the machine 100, according to an embodiment. In the schematic diagram, the flow direction of the electric power in the system is denoted by arrows. The solid-lined arrows denote the flow of the electric power when the machine 100 is being propelled. Conversely, the flow of the electric power during a braking mode of the machine 100 is denoted by dash-lined arrows in FIG. 2, while the dotted line arrow designates control line connection between components of the electric drive 112.

A person skilled in the art will understand that the generator 118 may produce electric power in the form of alternating current (AC) power. This electric power may be supplied to a rectifier 122 and converted to direct current (DC) power. The rectified DC power may be converted again to AC power by an inverter circuit 124. The inverter circuit 124 may be capable of selectively adjusting the frequency and/or pulse-width of the output, such that the drive motors 120 that are connected to an output of the inverter circuit 124 may be operated at variable speeds. In an embodiment, a plurality of inverter circuits 124 may be disposed in connection with the drive motors 120 in the machine 100.

FIG. 2 further illustrates a dynamic braking system 200 for the machine 100. The dynamic braking system 200 may be in connection with the drive motors 120 of the machine 100. Specifically, the dynamic braking system 200 may be operatively disposed in connection with the inverter circuit 124 in the machine 100. The dynamic braking system 200 may be configured to slow the propulsion of the machine 100 during braking mode as per an operator command in the machine 100.

According to the present disclosure, the dynamic braking system 200 may include a control unit 202, which may be a combination of, but not limited to, a hardware component, computing device, or other processing equipment, and memory, such as a Random Access Memory (RAM), a Read Only Memory (ROM), flash memory, a data structure, and the like. The control unit 202 may be configured to execute instructions (e.g., the processing equipment may be configured to execute the instructions stored on the data structure of the control unit 202). The control unit 202 may be configured to receive the operator command in the machine 100. Further, the control unit 202 may determine whether to put the machine 100 in the braking mode or not, based at least in part on the operator command. To initiate braking of the machine 100, the control unit 202 may generate a braking signal (illustrated by dotted line) for the inverter circuit 124. A dashed arrow represents optional signals, inputs, or data 211 that may be received by the control unit 202 from the resistor grid system 111 during operation.

The braking signal may be received by the inverter circuit 124 in the machine 100. The braking signal may carry instructions to reverse a torque polarity of the drive motors 120. This makes the drive motors 120 to act as generators, using the mechanical power in the form of rotational energy from the set of drive wheels 108 to produce electric power. This electric power may be supplied back to the electric drive 112 in the machine 100.

The dynamic braking system 200 may further be configured to provide regenerative braking in the machine 100. For this purpose, the dynamic braking system 200 may include an energy storage unit 204. The energy storage unit 204 may include a battery, a plurality of capacitors or the like disposed in connection with the drive motors 120 in the electric drive 112. As during braking mode, the drive motors 120 may produce electric power, the energy storage unit 204 may store this electric power for later use in the machine 100.

The present disclosure is applicable to many machines, for example, a large off-highway truck, such as a dump truck, which are commonly used in mines, construction sites and quarries. The machine 100 may have a high payload capability and a travel speed of a few miles per hour when fully loaded. The machine 100 may further be required to operate in a variety of environments, at a variety of altitudes, and to negotiate steep inclines in dry or wet conditions.

Typically, to halt or slow down such machines, friction-based brakes coupled to the set of drive wheels and idle wheels are used. These friction-based brakes are effective but may wear out with prolonged use. To overcome this, the dynamic braking system 200 of the machine 100 of the present disclosure may work in combination with or without these friction-based brakes. The dynamic braking system 200 may supplement these friction-based brakes in the machine 100 and thus helps in reducing the wear of such brakes.

The dynamic braking system 200 may act on the operator command to put the machine 100 in the braking mode. Specifically, the operator command may be received by the control unit 202 in the dynamic braking system 200. The control unit 202 generates the braking signal determined at least in part by the operator command. This determination or calculation may be based on various operating parameters of the machine 100, such as, the current speed, the current payload, the rate of acceleration, the desired speed and so forth.

Subsequently, the braking signal may be received by the inverter circuit 124 in the electric drive 112 of the machine 100. In the braking mode, the electric drive 112 may switch the torque polarity of the drive motors 120, which makes the drive motors 120 to act as generators. In this mode, the drive motors 120 may use the power from the set of drive wheels 108, which ultimately discharges the mechanical energy of the set of drive wheels 108 and achieves slowing or braking of the machine 100. Further, the drive motors 120, consuming the mechanical power from the set of drive wheels 108, may generate electric power in the electric drive 112.

This generated electric power may be fed to the dynamic braking system 200 in the electric drive 112. The generated electric power, which may be in the form of AC, may be fed via the inverter 124 which converts AC electric power into DC electric power. In an embodiment, with the machine 100 having regenerative braking, a part of the generated electric power may be supplied to the modular resistor grid system 111 to be dissipated as heat and may be supplied to the energy storage unit 204 for storage for later use in the machine 100.

Modular Resistor Grid System

The dynamic braking system 200 may include the modular resistor grid system 111. As described above, the modular resistor grid system may be electrically connected to the motors 120 via an inverter circuit 124. In some embodiments, the modular resistor grid system 111 may be electrically connected to the energy storage unit 204 via the inverter circuit 124. The modular resistor grid system 111 may be configured to dissipate electrical charge in the form of heat. In some embodiments, the modular resistor grid system 111 is configured to dissipate some or all of the electric power generated by the motor during a resistive braking event as heat. In some embodiments, the modular resistor grid 111 may be configured to dissipate electrical charge provided by the energy storage unit 204 to the modular resistor grid system as heat.

Figure 3:
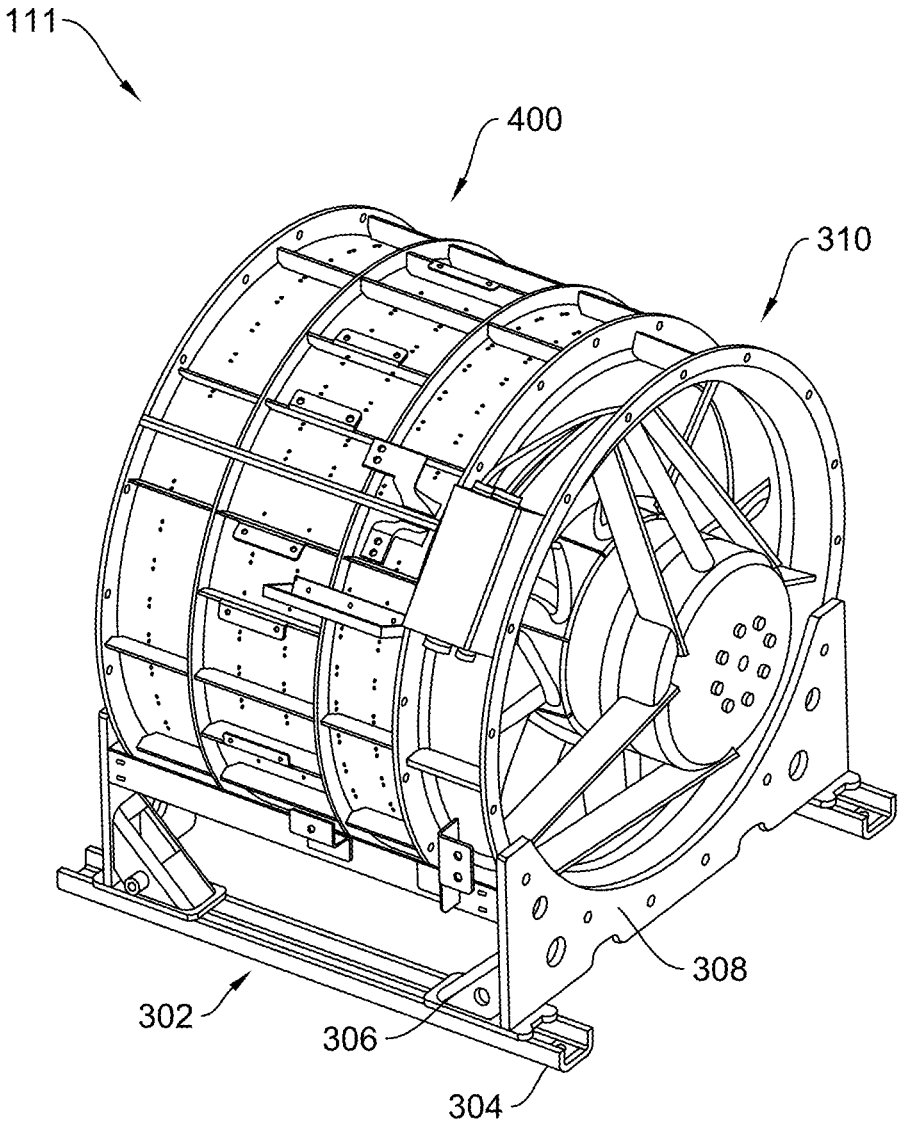
FIG. 3 is a perspective view of an exemplary modular resistor grid system, according to an embodiment.
Figure 4:
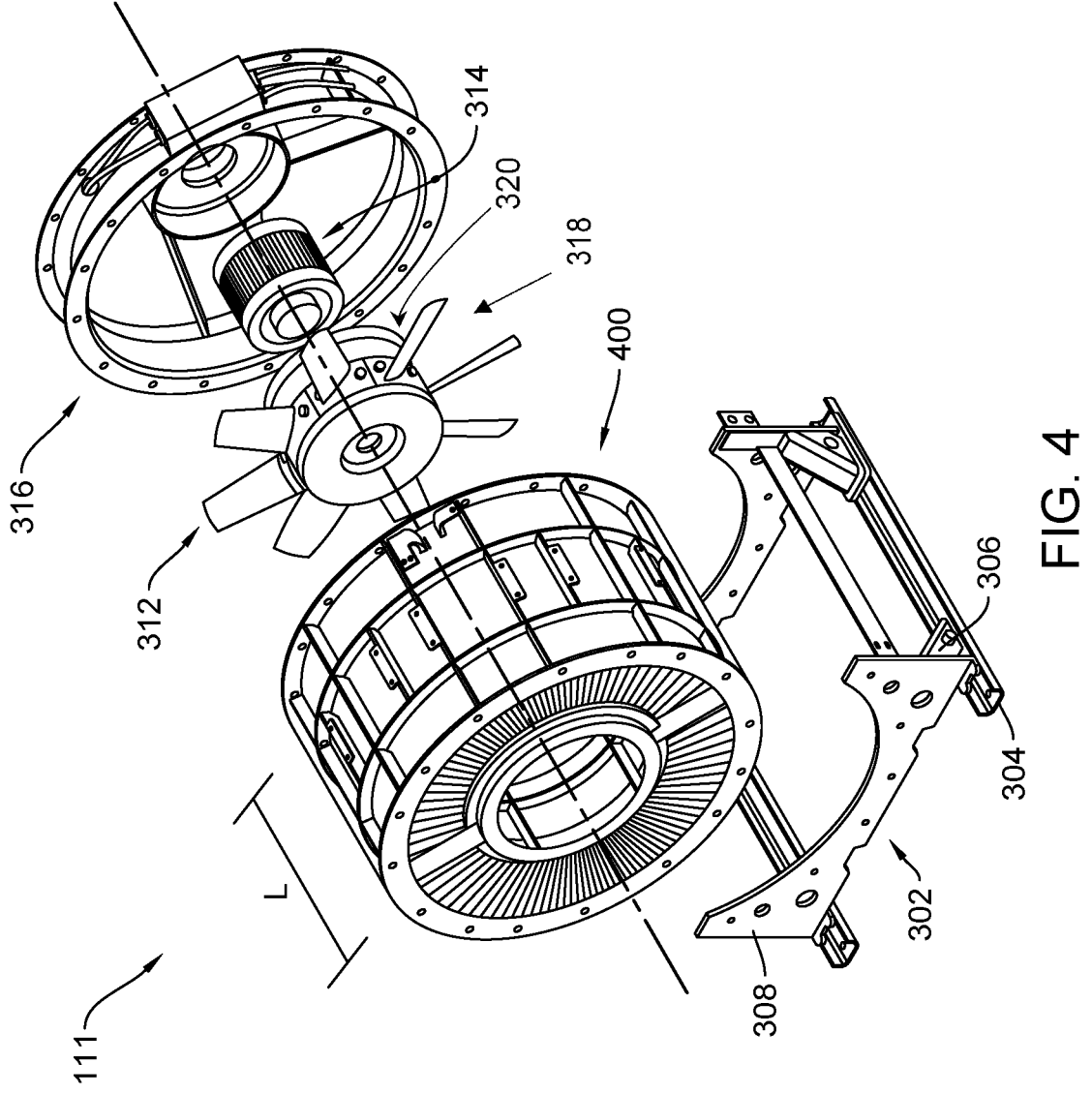
FIG. 4 is an exploded view of the modular resistor grid system of FIG. 3A.

FIG. 3 illustrates a perspective view of the modular resistor grid system 111, according to an aspect of the present disclosure. FIG. 4 illustrates an exploded view of the modular resistor grid system of FIG. 3. Referring to FIGS. 3 and 4, the modular resistor grid system 111 includes a mount 302, a fan 310, and a modular resistor grid assembly 400. The mount 302 may be permanently or removably coupled to the machine 100. The mount 302 provides a support structure upon which the other components of the modular resistor grid system 111 may be secured, connected, and/or coupled to the dynamic braking system 200 of the machine 100. The mount 302 may include a frame 304 and one or more brackets 306. The frame 304 may include rigid supporting members such as bars, rails, posts, tracks, or other suitable elements to affix the components of the modular resistor grid system 111 to the machine 100. The brackets 306 may be selectively moveable brackets 306 such that one or more brackets 306 can be fastened to a first position along the frame 304, loosened, allowed to slide along the length of the frame 304 to a second position, then tightened to secure the bracket 306 in the second position. The brackets 306 may also include a mounting feature 308 configured to align or abut with the components of the modular resistor grid system 111 such that the components may be fastened together by bolts, welds, or other suitable fasteners. For example, in FIGS. 3 and 4, moveable brackets 306 are coupled to mounting features 308 that are shaped to fit the cylindrical profile of the modular resistor grid system 111, according to an aspect of the present disclosure. In this way, multiple modular resistor grid assemblies 400 of varying axial length L may be coupled to the mount 302 by sliding and securing the moveable brackets 306 as needed along the frame 304.

The modular resistor grid system 111 also includes a fan 310. The fan 310 is configured to blow cooling air through the modular resistor grid assembly 400 in order to dissipate heat, for example, during a resistive braking mode of the machine 100 or during a battery discharge event. The fan 310 may include a blade assembly 312 configured to direct air towards or through the modular resistor grid assembly 400 as the blade assembly 312 rotates. A power source 314 (e.g., a motor, battery, etc.) may power the fan 310, and a hub assembly 316 may direct air towards the modular resistor grid assembly 400 and/or encase and protect the components of the fan 310.

The modular resistor grid system 111 includes a modular resistor grid assembly 400. The modular resistor grid assembly 400 facilitates resistive braking by receiving and dissipating power from the machine 100 in the form of heat. In some embodiments, the modular resistor grid assembly 400 may be formed by as a single unit or may be formed from a single modular resistor grid. In other embodiments, the modular resistor grid assembly 400 may be formed by coupling together multiple modular resistor grids 402 (See, e.g., FIGS. 5 and 6 discussed below). The modular resistor grid assembly 400 includes a housing 404 which may provide support to various elements of the modular resistor grid system 111. In the illustrated example of FIGS. 3-5, the housing 404 has a cylindrical shape having an inner wall 406 and an outer wall 408. The housing 404 may be in any shape and may divided into one or more modular sections. For example, the housing 404 of the modular resistor grid assembly 400 may be formed by coupling together two or more modular resistor grids 402, each having a housing 404 encasing one or more resistor elements 410. The modular resistor grids 402 may be cylindrical, semicylindrical, quadrant-shaped, wedge-shaped, triangular, or other suitable shapes. The number of subsections of housing 404 and the number of individual modular resistor grids 402 that may be coupled together to form the modular resistor grid assembly 400 may vary depending on the space constraints in the machine 100.

Figure 5:
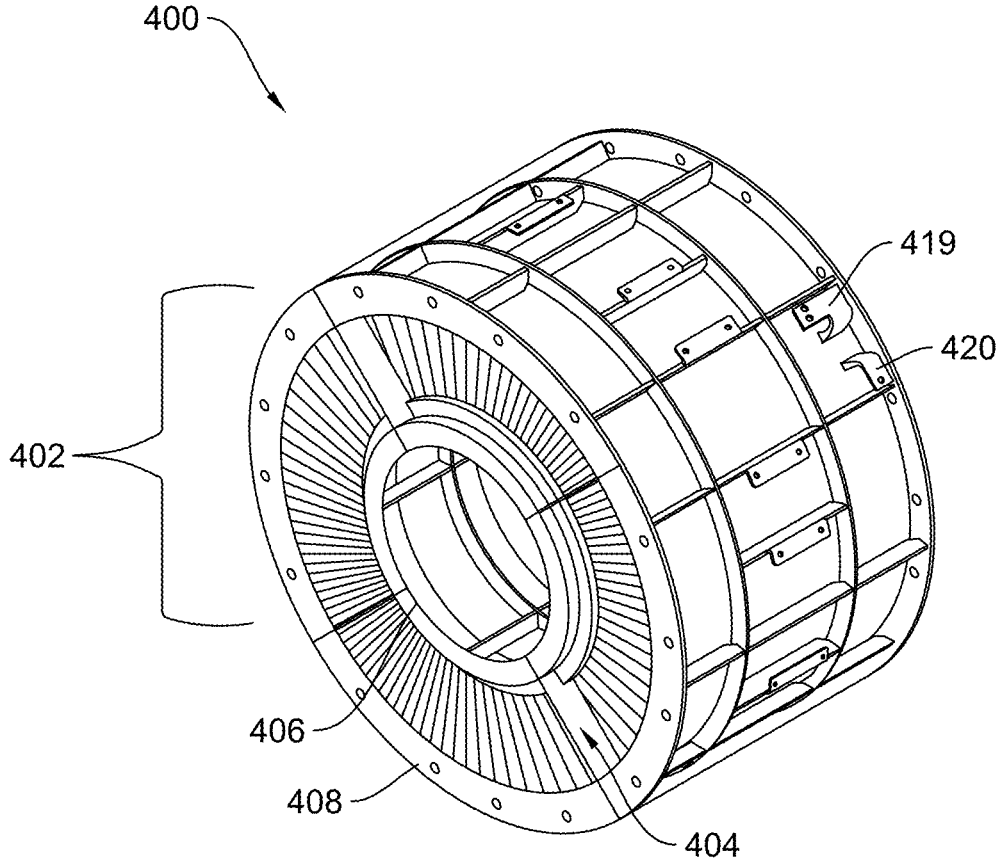
FIG. 5 is a perspective view of a modular resistor grid assembly, according to an embodiment.
Figure 6:
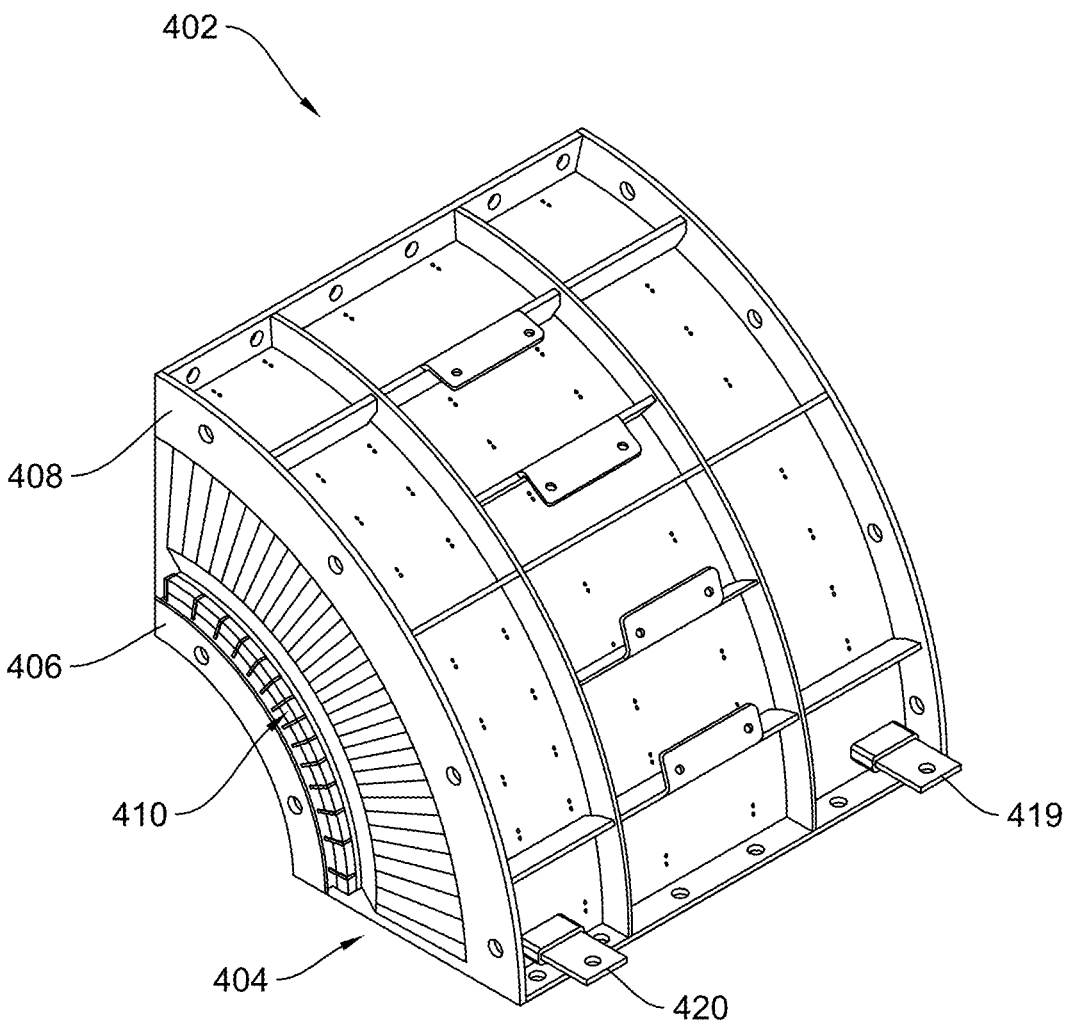
FIG. 6 is perspective view of a modular resistor grid of the modular resistor grid assembly of FIG. 5, according to an embodiment.

For example, FIG. 5 and FIG. 6 illustrate an embodiment of the modular resistor grid assembly 400 that is divided into four quadrant-shaped modular resistor grids 402, which are assembled with each other in the machine 100. The modular resistor grid assembly 400 and the modular resistor grid 402 include at least one resistor element 410 disposed between the inner wall 406 and the outer wall 408 of the housing 404. The modular resistor grid assembly and/or the modular resistor grid 402 may include two or more resistor elements 410 (e.g., a plurality of resistor elements 410) that are closely packed in a stacked configuration abutting in an end-to-end orientation. The resistor elements 410 may be uniformly arranged in the housing 404 to maintain air spaces between each other. This uniform spacing assures an adequate flow of cooling air between the resistor elements 410 in the modular resistor grid system 111. Moreover, one or more cooling air vents may be provided in the housing 404 for circulation of cooling air in the modular resistor grid system 111.

Figure 7:
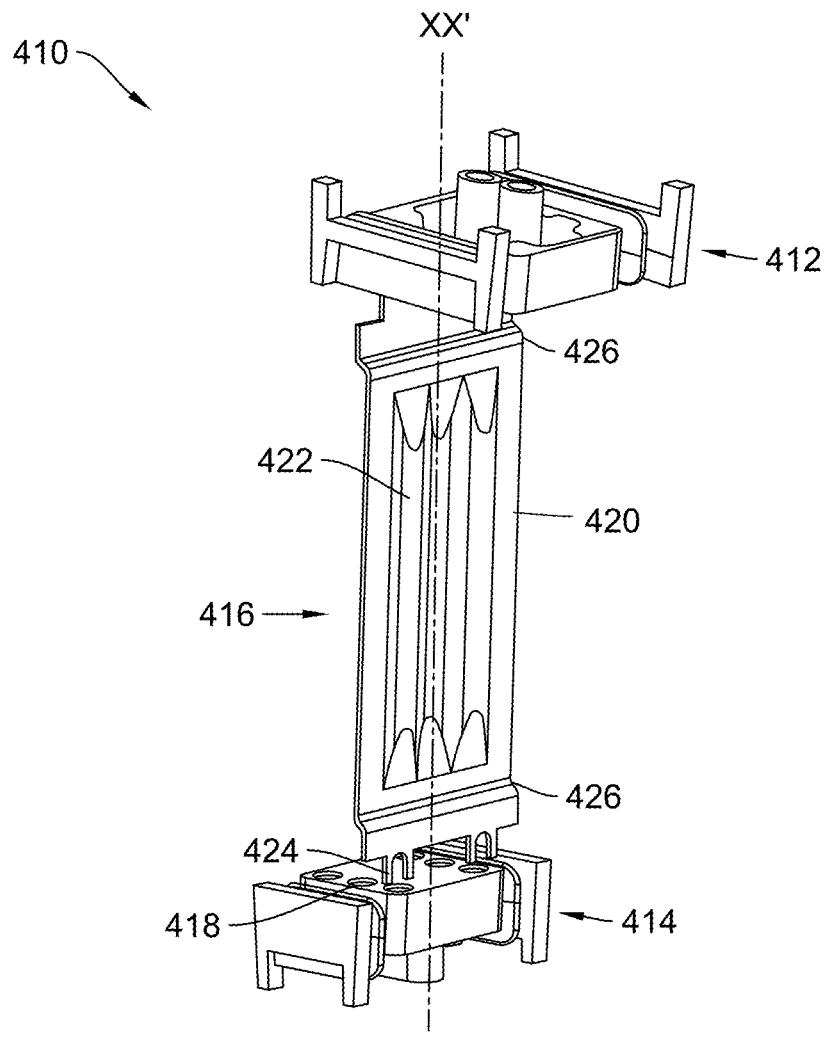
FIG. 7 is a perspective view of a resistor element, according to an embodiment.

FIG. 7 illustrates a resistor element 410 according to an embodiment. The resistor element 410 includes a first insulator 412, a second insulator 414, and one or more resistor plates 416 mounted to the first insulator 412 and the second insulator 414. In the example illustrated, the resistor plate 416 is mounted between the first insulator 412 and the second insulator 414, which in turn may be affixed to the inner wall 406 and the outer wall 408 of the housing 404 of the modular resistor grid assembly 400 and/or the modular resistor grid 402. Further, the one or more resistor elements 410 may be arranged in one or more rows, substantially parallel to each other in a close face-to-face relationship forming an axial airflow path therebetween. Multiple resistor plates 416 of the resistor element 410 may be connected in series within each modular resistor grid 402 and/or the modular resistor grid assembly 400 to provide a continuous current path between an input terminal 419 and an output terminal 420 (See FIGS. 5 & 6) of the modular resistor grid 402 and/or the modular resistor grid assembly 400. For this purpose, a conducting member may be disposed in the housing 404, electrically connecting the two or more resistor plates 416 in the modular resistor grid system 111. The conducting member may be a conductive wire, a weld, etc. The resistor units 410 may be connected in a manner such that the modular resistor grid system 111 may have two current circuits, a contactor power circuit and a chopper power circuit.

As illustrated, the first insulator 412 and the second insulator 414 may be in the shape of a block made of insulating material such as silicon bonded laminated mica, ceramic, glass reinforced material, etc. However, any other material with insulating properties may be used to form the first insulator 412 and the second insulator 414. The first insulator 412 may be affixed to the outer wall 408 of the housing 404 by some fastening member, such as, nuts and bolts, screws, etc. The second insulator 414 may be similarly fastened to the inner wall 406 of the housing 404. The first insulator 412 and the second insulator 414 may each include one or more apertures 418 formed therein. Further, the apertures 418 may not be extending through the first insulator 412 or the second insulator 414 and may be configured to receive and mount the resistor plate 416 between the first insulator 412 and the second insulator 414.

The resistor plate 416 may be formed from a continuous strip of resistive material such as stainless steel. The resistor plate 416 may include a body portion 420 extending along a longitudinal direction XX' of the resistor plate 416. In an embodiment, the resistor plate 416 may also include a series of reflexed portions 422 disposed at opposite longitudinal sides in the body portion 420 of the resistor plate 416. In some configurations, the resistor plate 416 may extend in the range of about 150 millimeters to about 200 millimeters along the longitudinal direction XX'. In a specific example, the resistor element 404 may have a length of about 160 millimeters. The resistor plate 416 may have a tip portion 424 disposed at an end 426 off the body portion 420. Alternatively, the resistor plate 416 may include two or more tip portions 424 disposed from both the ends 426. The tip portions 424 of the resistor plate 416 may be adapted to be received in the apertures 418 of the first insulator 412 and the second insulator 414. The apertures 418 may provide some clearance for movement of the tip portions 424 within. This allows for the resistor plate 416 to move in the longitudinal direction XX' in the resistor element 410 upon thermal expansion and thermal contraction.

During a resistive braking event or a battery discharge event, a flow of electric power may pass into the modular resistor grid system 111 via the input terminal 419 and flow through the resistor plates 416 in the resistor element 410 of the modular resistor grid system 111 to be dissipated as heat. Specifically, the heat is generated by the body portion 420 of the resistor plate 416. This generated heat may be radiated to the first insulator 412 and the second insulator 414 and raise the temperature of the first insulator 412 and the second insulator 414 in the resistor element 410. The normal continuous operating temperature for the first insulator 412 and the second insulator 414 is in the range of 300 to 400 degrees Celsius, according to industry standards. For short intervals, the temperature of the first insulator 412 and the second insulator 414 may reach higher values due to surges, but if the temperature rises above a critical or maximum operating temperature for extended periods of time, the lifetime of the first insulator 412 and the second insulator 414 may be greatly reduced. Further, the mechanical stability of the resistor plates 416 may be compromised, causing the resistor plates 416 to bend and ultimately leading to rapid failure of the dynamic braking system 200.

State of Charge Optimization

Figure 8:
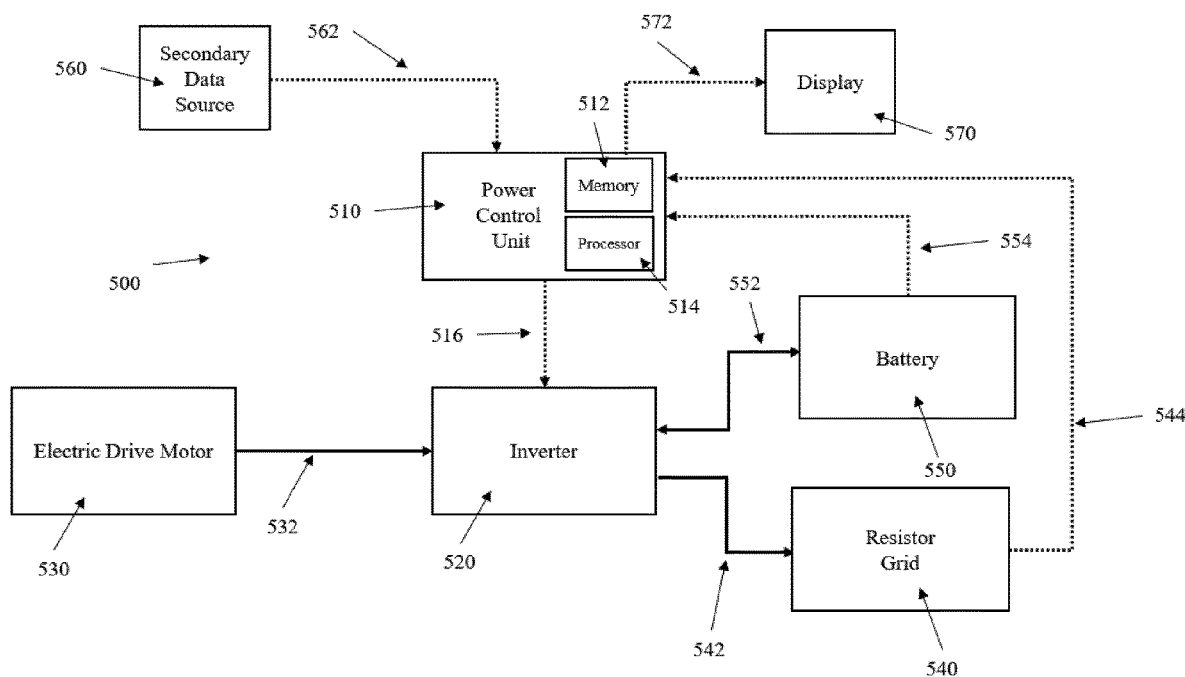
FIG. 8 is a schematic of a power control system, according to an embodiment.

A schematic of the resistive braking system is shown in FIG. 2, and a schematic of a power control circuit is shown in FIG. 8. With reference to FIG. 2, in operation, during a resistive braking event, a braking signal is sent to the inverter circuit 124, causing the circuit to reverse a torque polarity of drive motors 120 coupled to the inverter circuit, thereby providing braking to the vehicle and causing the drive motors to produce electrical charge. This electrical charge may be directed to the resistor grid system 111 to be dissipated as heat, or may be directed to an energy storage unit 204 for storage.

In some embodiments, during a resistive braking event, the generated electrical charge is directed to the energy storage system until the energy storage system has reached a target storage capacity and then any remaining electrical charge is directed to the resistor grid system 111 for dissipation. During some resistive braking events, the generated electrical charge may be directed to both the resistor grid system 111 and the energy storage unit 204 simultaneously so as to maximize the usage of the electrical charge.

The energy storage unit 204 may include a battery that is configured to store and discharge electrical current. Electrical current received by the battery may be stored as electrical charge for later discharge. The battery may have a capacity indicative of an amount of electrical charge that may be stored in the battery. The battery may have a target capacity indicative of a desired or optimal charge level of the battery. In some embodiments, the battery may be a metal or metal-ion battery. In some embodiments, the battery may be a lithium battery, a lithium ion battery, a lead-acid battery, a nickel-metal hydride battery, a nickel-cadmium battery, a lithium-cobalt oxide battery, a lithium-iron phosphate battery, a solid-state battery, a nickel battery, a sodium-nickel-chloride battery, or a lithium-sulfur battery, among other types of batteries.

Turning now to FIG. 8, in some embodiments, a power control unit 500 may be used to control the flow of electrical charge (shown as solid arrows 532 542 552 in FIG. 8) between an inverter 520, electric drive motors 530, and the battery 550. In some embodiments, the power source 530 is one or more electric drive motors which utilize power or electrical current 532 to drive the vehicle during normal operation and which produce power or electrical current 532 during a resistive braking event, as previously described. One embodiment of a suitable power control circuit 500 is illustrated as a schematic diagram in FIG. 8, however it should be understood that other configurations may be possible.

In an embodiment, the power control circuit 500 includes a control unit 510, which includes one or more processors 504 and a computer memory 502. The power control unit 510 may be a combination of, but not limited to, a set of instructions stored on a computer memory 512, one or more processors 514 configured to execute the set of instructions, a Random Access Memory (RAM), a Read Only Memory (ROM), flash memory, a data structure, and the like. The power control unit 510 may be configured to receive various input signals 562 544 554 and to provide output signals 516 572, shown as dashed lines in FIG. 8. The memory 512 stores code that, when executed by the one or more processors 514, sends signals 516 that control the distribution of power by the inverter 520 according to input signals 562 554 544 received by the power control unit 510.

The control unit 510 may be configured to send an operation signal 516 to the inverter 520. The operation signal 516 may be a signal providing instructions to the inverter to direct power between the electric drive motors 530, the resistor grid 540, and the battery 550. During normal operation of the vehicle, the operation signal 516 may cause the inverter 520 to provide electrical current from the battery 550 to the electric drive motor(s) 530 to provide driving force to the vehicle. During a resistive braking event, the operation signal 516 provided by the power control unit 510 may cause the inverter 520 to direct electrical current produced 532 by the electric drive motor(s) 530 to the battery 550, the resistor grid 540, and/or a combination thereof.

The processor(s) 514 of power control unit 510 may determine a state of charge of the battery 550 as compared to the battery's charge capacity. The state of charge may be expressed as a capacity using amp-hours (Ah), watt-hours (Wh), or other units that would be familiar to one skilled in art, or as a percentage, ratio, or fraction of the battery's current charge compared to the total capacity. As a non-limiting example, the battery 550 may have a state of charge of 50% at a given time, which correlates to the battery storing electrical charge equal to 50% of the battery's electrical charge capacity. Other units, fractions, or ratios may also be used. As will be readily understood by one skilled in the art, other values for the state of charge expressed as a percentage of total capacity may range from 0%-100% on a continuous scale (e.g, 0%-100% with all possible values in between). The processor(s) 514 may determine the state of charge of the battery 550 at least partially according to a charge signal 544 received from the battery. Alternatively or in addition, the processor(s) 514 may determine the state of charge at least partially according to a predictive computation model of the battery state of charge. The charge signal 554 may correspond to a voltage or amperage associated with one or more portions or cells of the battery 550.

The processor(s) 514 of power control unit 510 may determine a target state of charge of the battery 550 as compared to the battery's charge capacity. Similar to the battery's state of charge, the target state of charge may also be expressed as a capacity using amp-hours (Ah) or other units that would be familiar to one skilled in art, or as a percentage, ratio, or fraction of the battery's current charge compared to the total capacity. As a non-limiting example, the battery 550 may have a target state of charge of 75% at a given time, which correlates to the battery storing electrical charge equal to 75% of the battery's electrical charge capacity. Other units, fractions, or ratios may also be used. As will be readily understood by one skilled in the art, values for the state of charge expressed as a percentage of total capacity may range from 0%-100% on a continuous scale (e.g, 0%-100% with all possible values in between). The processor(s) 514 may determine a target state of charge of the battery according to determined state of charge of the battery. The processor(s) 514 may determine a target state of charge of the battery according to the charge signal 554 received from the battery. The processor(s) 514 may determine a target state of charge of the battery according to one or more of a planned route for the vehicle, an anticipated battery discharge event, an anticipated battery charge event, an anticipated resistive braking event, an anticipated downhill travel event for the vehicle, an anticipated climb event for the vehicle, a predetermined time of day, a set passage of time or time interval, an ambient air temperature, an ambient air pressure, an elevation of the vehicle, or other parameters.

The processor(s) 514 may determine the state of charge of the battery 550 and the target state of charge of the battery in response to an input from an operator, the location of the vehicle, an elevation of the vehicle, a grade of the vehicle, an ambient air temperature, an ambient air pressure, a cooling load for the resistor grid, or a combination of two or more thereof. The processor(s) 514 may determine the state of charge of the battery 550 and the target state of charge of the battery in response to a change in the location of the vehicle, an elevation of the vehicle, a grade of the vehicle, an ambient air temperature, an ambient air pressure, a cooling load for the resistor grid, or a combination of two or more thereof.

The processor(s) 514 of the power control unit 510 may determine a differential between the battery's 550 state of charge and target state of charge. In some embodiments, the power control unit 510 may send a control signal 516 according to the determined differential. In some embodiments, the power control unit 510 may send a control signal 516 when the determined differential is greater than a predetermined threshold. For example, in some embodiments, the power control unit 510 may send a control signal 516 to the inverter when the determined differential is greater than 3%. In some embodiments, the power control unit 510 may send a control signal 516 to the inverter when the determined differential is greater than 1%, 2%, 3%, 4% or 5%. In some embodiments, the power control unit 510 may send a control signal 516 to the inverter when the determined differential is greater than 10%, 20%, 30%, 40% or 50% (or any other percentage differential). Other units for the state of charge may also be considered. As another non-limiting example, in some embodiments, the power control unit 510 may send a control signal 516 to the inverter when the determined differential is greater than 1 kWh, 5 kWh, 10 kWh, 50 kWh, or 100 kWh. As another non-limiting example, in some embodiments, the power control unit 510 may send a control signal 516 to the inverter when the determined differential is greater than 100 kWh, 200 kWh, 300 kWh, 400 kWh, or 500 kWh.

During normal drive operation of vehicle, the power control unit 510 may send a control signal 516 to the inverter to cause the inverter to provide electrical charge from the battery to the electric drive motor 530, thereby at least partially powering the electric drive motor 530. In some embodiments, during a resistive braking event, such as when the vehicle is travelling downhill, the power control unit 510 may send a control signal 516 to the inverter to cause the inverter to provide electrical charge from the electric drive motor 530 to the resistor grid 540 to dissipate at least a portion of the generated electrical charge as heat. In some embodiments, during a resistive braking event, the power control unit 510 may send a control signal 516 to the inverter to cause the inverter to provide electrical charge from the electric drive motor 530 to the battery 550 to recharge the battery. In some embodiments, during a resistive braking event, the power control unit 510 may send a control signal 516 to the inverter to cause the inverter to provide electrical charge from the electric drive motor 530 to the battery 550 until a target state of charge for the battery is reached. The power control unit 510 may send a control signal 516 to cause the inverter to provide the excess electrical charge (e.g., beyond the electrical charge needed to provide the target state of charge) to the resistor grid 540. In some embodiments, during a resistive braking event, the power control unit 510 may send a control signal 516 to the inverter to cause the inverter to provide electrical charge from the electric drive motor 530 to the battery 550 and to the resistor grid 540 simultaneously (e.g., in parallel).

With continued reference to FIG. 8, the power control unit 510 may be configured to also determine, using the one or more processors and memory, a reduced target state of charge of the battery 550 in anticipation of a charging event, or an event that will produce electrical charge. In such a scenario, if the state of charge is greater than the target state of charge, the power control unit 510 may provide a control signal 516 to the inverter to cause the inverter 520 to provide electrical charge from the battery 550 to the resistor grid 540, thereby discharging at least a portion of the electrical charge stored in the battery by dissipating the charge as heat. As a non-limiting example, in some embodiments, the power control unit 510 may send a control signal 516 to the inverter 520 causing the inverter to provide electrical charge from the battery 550 to the resistor grid 540 in anticipation of a downhill travel event. This allows the vehicle to engage the resistive braking mode more effectively, as the electrical charge generated by the braking electric drive motor 530 can be directed to both the battery 550 and to the resistor grid 540 simultaneously. This results in the battery acting as a sink for the electrical charge generated by the electric drive motors during a resistive braking event, representing an increased capacity of the power control system 500 to handle the electrical charge generated by the electric drive motors 530. Utilizing the battery as a sink may allow the vehicle to traverse downhill slopes more rapidly or more efficiently than otherwise possible. Utilizing the battery as a sink may also allow the vehicle to rely less on the resistor grid, reducing wear and tear on the resistor grid and reducing failure rates of associated components. Thus, in some embodiments, the power control unit 510 may be favorably configured to determine the target state of charge of the battery 550 according to the elevation at which the vehicle is operating, the grade on which the vehicle is operating, the vehicle's planned route, among other possibilities.

As discussed above, the power control system 500 may include one or more secondary data sources 560. The secondary data sources may include, but not be limited to, remote or local databases or servers, processors, memory, and/or local or remote sensors. For example, the power control unit 510 may receive a signal 562 corresponding to the temperature of the ambient air around the vehicle, the density of the ambient air around the vehicle, the location of the vehicle, the elevation at which the vehicle is operating, the grade on which the vehicle is operating, the time of day, or information regarding the planned route of the vehicle. Even though a single source 560 is shown, it should be understood that data signals 562 could be provided by a separate sensor or data source, such as a temperature sensor configured to measure the temperature of the ambient air around the vehicle or an altimeter configured to measure the elevation at which the vehicle is operating. It should also be understood that a single data source 560 may provide multiple types of data or data points. For example, a remote server may transmit a signal providing data on the elevation of the vehicle and the ambient air density or pressure.

The power control unit 510 may be configured to provide an output signal 560 to an interface or network (not shown). Information determined by, calculated by, derived by, identified by, or otherwise present in the power control unit 510 can thus be transmitted via an output signal to other devices. In some embodiments, the interface is a user interface such as a graphical display 570. A display may be positioned in the cab of the vehicle showing the state of charge and/or target state of charge of the battery 550, if desired. The display 570 may be interactive and may allow an operator to select a target state of charge for the battery 550. In an embodiment in which the target state of charge of the battery 550 is selected by an operator, the display may also display a recommended target state of charge for the battery.

Figure 9:
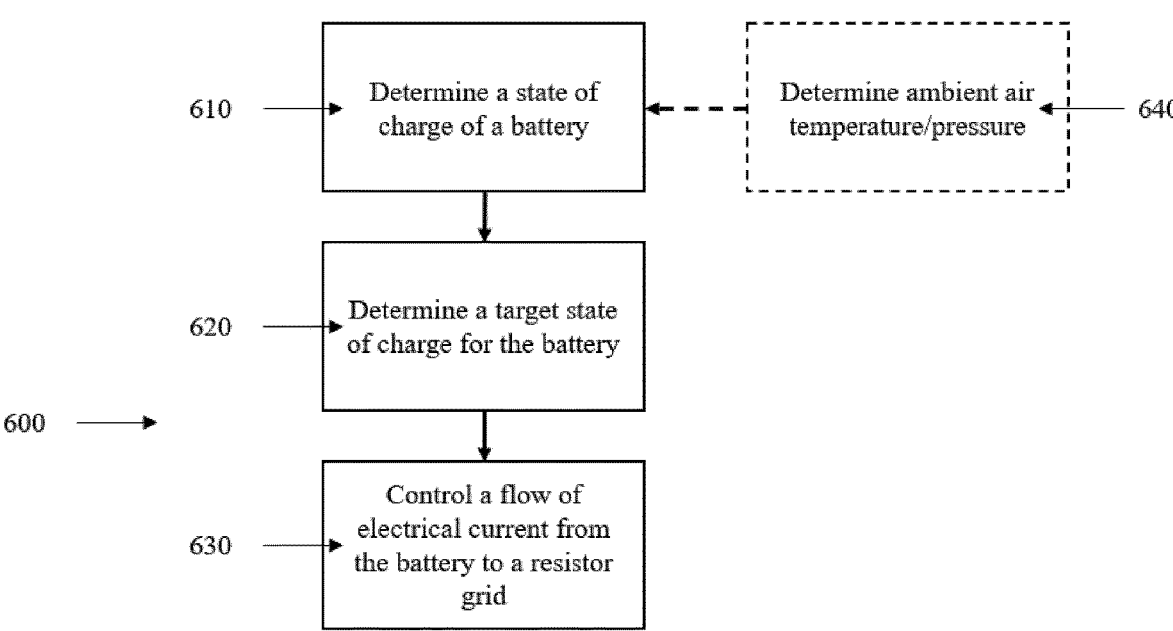
FIG. 9 is a schematic of a method of operating an electric drive machine, according to an embodiment.

These principles can be applied to a method of operating a vehicle with a resistive braking system utilizing a battery as a sink for electrical energy produced during braking. With reference to FIG. 9, a method 600 of operating such a vehicle is shown according to an embodiment. In the first step 610, one or more processors associated with a control unit on the vehicle may determine the state of charge of the battery associated with the resistor grid system providing resistive braking capacity to the vehicle. The processor(s) may determine the state of charge of the battery according to a measured voltage or amperage associated with one or more cells of the battery or with a measured amperage or voltage of a flow of electrical charge entering or leaving the battery. The processor(s) may determine the state of charge of the battery according to a predicted state of charge of the battery according to a computation model of the battery. In some embodiments, the processor(s) may determine the state of charge of the battery according to physical measurements associated with the battery, computational models of the battery, or a combination of physical measurement and computational models.

The processor(s) may determine the state of charge in according a location or position of the vehicle, the predicted path of the vehicle, a predetermined path of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system. In some embodiments, the processor(s) may determine the state of charge in response to a change in the location of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system.

The processor(s) may determine the target state of charge in response to an instruction, a signal, or an input, which may be provided by an operator or may be provided by an automated system. The processor(s) may determine the state of charge after a certain period of time has passed since a state of charge determination. As a non-limiting example, the processor(s) may determine the state of charge every 1 second, every 5 second, every 10 second, every 20 seconds, every 30 second, every 1 minute, every 2 minutes, every 5 minutes, every 10 minutes, every hour, or any fraction of time as desired.

In a second step 620, one or more processors associated with a control unit on the vehicle may determine the target state of charge of the battery associated with the resistor grid system providing resistive braking capacity to the vehicle. The processor(s) may determine the target state of charge of the battery according to a measured voltage or amperage associated with one or more cells of the battery or with a measured amperage or voltage of a flow of electrical charge entering or leaving the battery. The processor(s) may determine the state of charge of the battery according to a predicted state of charge of the battery according to a computation model of the battery. In some embodiments, the processor(s) may determine the target state of charge of the battery according to physical measurements associated with the battery, computational models of the battery, or a combination of physical measurement and computational models. to an ambient air temperature, an ambient air density, an elevation of the vehicle, a capacity of the resistor grid, a temperature of a component of the resistive braking system, a maximum fan speed, a fouling factor of the resistor grid, a fouling factor of the fan, or another parameter related to the resistor grid system. In some embodiments, the processor(s) may determine the cooling load in response to a measured temperature of a change in the temperature of a component of the resistive braking system.

The processor(s) may determine the target state of charge according to a location or position of the vehicle, the predicted path of the vehicle, a predetermined path of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system. In some embodiments, the processor(s) may determine the target state of charge in response to a change in the location of the vehicle, the predicted path of the vehicle, a predetermined path of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system. In some embodiments, the processor(s) may determine the target state of charge in anticipation of a battery charge event or a downhill haul event.

The processor(s) may determine the target state of charge in response to an instruction, a signal, or an input, which may be provided by an operator or may be provided by an automated system. The processor(s) may determine the state of charge after a certain period of time has passed since a state of charge determination. As a non-limiting example, the processor(s) may determine the state of charge every 1 second, every 5 second, every 10 second, every 20 seconds, every 30 second, every 1 minute, every 2 minutes, every 5 minutes, every 10 minutes, every hour, or any fraction of time as desired.

In a third step 630, the power control unit controls a flow of electrical current from the battery to a resistor grid, thereby dissipating at least a portion of the electrical charge stored in the battery. This may allow the vehicle to undergo a charge event, such as a downhill haul event, with greater available capacity for the electrical charge generated during the regenerative braking process. The control unit may direct a flow of electricity from the battery to the resistor grid according to a determined voltage or amperage. The control unit may also determine a differential between the state of charge of the battery and the target state of charge and direct electrical charge from the battery to the resistor grid when the differential reaches or exceeds a predetermined value.

The method may also include a step 640 of using the one or more processors to determine the temperature and/or pressure of the ambient air in which the vehicle is operating. Sensor may provide data to the control unit associated with the processor(s), such that this data may be accounted for when the processor(s) determine the target state of charge of battery, as these variable may affect the performance and capacity of the resistor grid system.

Figure 10:
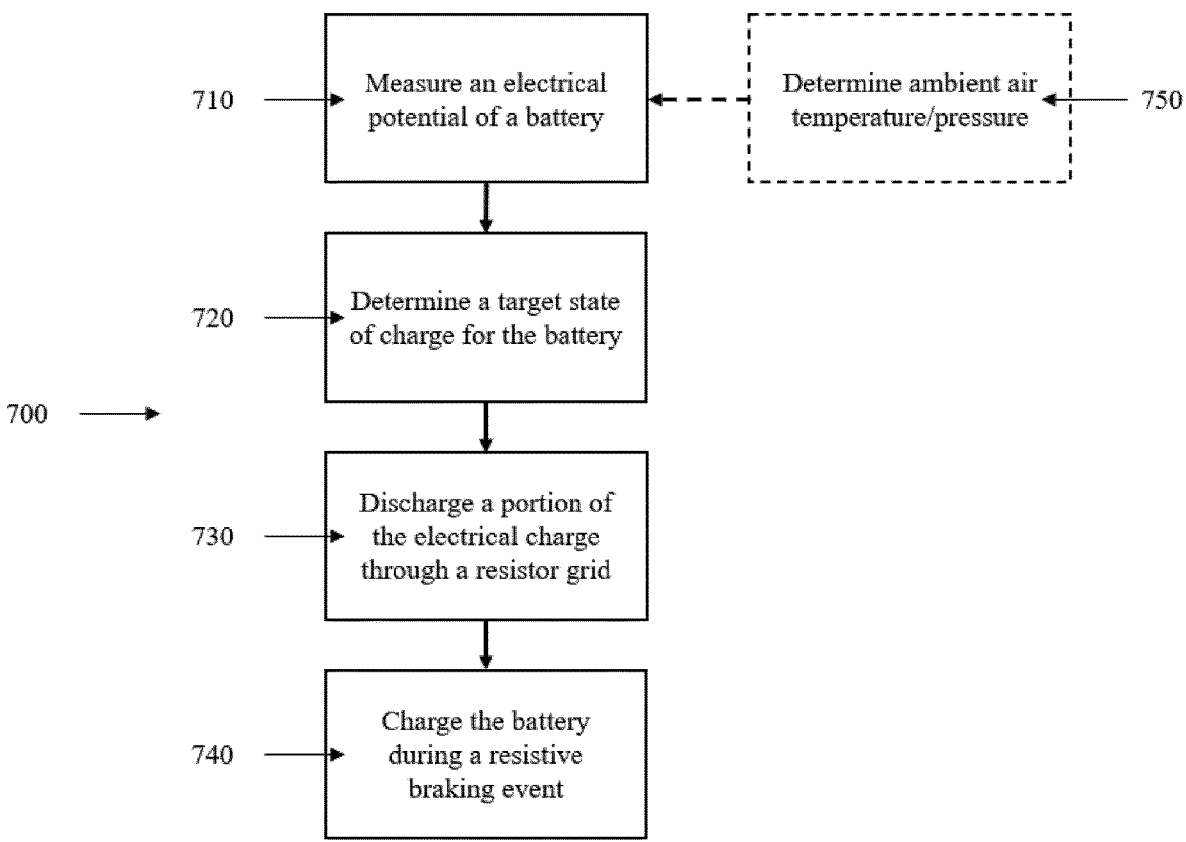
FIG. 10 is a schematic of a method of operating an electric drive machine, according to an embodiment.

With reference to FIG. 10, a second method 700 of operating such a vehicle is shown according to an embodiment. In the first step 710, one or more processors associated with a control unit on the vehicle may determine the state of charge of the battery associated with the resistor grid system providing resistive braking capacity to the vehicle. The processor(s) may determine the state of charge of the battery according to a measured voltage or amperage associated with one or more cells of the battery or with a measured amperage or voltage of a flow of electrical charge entering or leaving the battery. The processor(s) may determine the state of charge of the battery according to a predicted state of charge of the battery according to a computation model of the battery. In some embodiments, the processor(s) may determine the state of charge of the battery according to physical measurements associated with the battery, computational models of the battery, or a combination of physical measurement and computational models.

The processor(s) may determine the state of charge in according a location or position of the vehicle, the predicted path of the vehicle, a predetermined path of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system. In some embodiments, the processor(s) may determine the state of charge in response to a change in the location of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system.

The processor(s) may determine the target state of charge in response to an instruction, a signal, or an input, which may be provided by an operator or may be provided by an automated system. The processor(s) may determine the state of charge after a certain period of time has passed since a state of charge determination. As a non-limiting example, the processor(s) may determine the state of charge every 1 second, every 5 second, every 10 second, every 20 seconds, every 30 second, every 1 minute, every 2 minutes, every 5 minutes, every 10 minutes, every hour, or any fraction of time as desired.

In a second step 720, one or more processors associated with a control unit on the vehicle may determine the target state of charge of the battery associated with the resistor grid system providing resistive braking capacity to the vehicle. The processor(s) may determine the target state of charge of the battery according to a measured voltage or amperage associated with one or more cells of the battery or with a measured amperage or voltage of a flow of electrical charge entering or leaving the battery. The processor(s) may determine the state of charge of the battery according to a predicted state of charge of the battery according to a computation model of the battery. In some embodiments, the processor(s) may determine the target state of charge of the battery according to physical measurements associated with the battery, computational models of the battery, or a combination of physical measurement and computational models. to an ambient air temperature, an ambient air density, an elevation of the vehicle, a capacity of the resistor grid, a temperature of a component of the resistive braking system, a maximum fan speed, a fouling factor of the resistor grid, a fouling factor of the fan, or another parameter related to the resistor grid system. In some embodiments, the processor(s) may determine the cooling load in response to a measured temperature of a change in the temperature of a component of the resistive braking system.

The processor(s) may determine the target state of charge in according to a location or position of the vehicle, the predicted path of the vehicle, a predetermined path of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system. In some embodiments, the processor(s) may determine the target state of charge in response to a change in the location of the vehicle, the predicted path of the vehicle, a predetermined path of the vehicle, an elevation of the vehicle, a grade of the surface the vehicle is operating on, an ambient air temperature, an ambient air density, an elevation of the vehicle, a capacity of the resistor grid, a temperature of a component of the resistive braking system, a fouling factor of the resistor grid, a fouling factor of the fan, or another parameter related to the resistive braking system. In some embodiments, the processor(s) may determine the target state of charge in anticipation of a battery charge event or a downhill haul event.

The processor(s) may determine the target state of charge in response to an instruction, a signal, or an input, which may be provided by an operator or may be provided by an automated system. The processor(s) may determine the state of charge after a certain period of time has passed since a state of charge determination. As a non-limiting example, the processor(s) may determine the state of charge every 1 second, every 5 second, every 10 second, every 20 seconds, every 30 second, every 1 minute, every 2 minutes, every 5 minutes, every 10 minutes, every hour, or any fraction of time as desired.

In a third step 730, a portion of the power stored in the battery may be discharged through a resistor grid. By discharging the battery power through or via the resistor grid, the vehicle may undergo a charge event, such as a downhill haul event, with greater available capacity for the electrical charge generated during the regenerative braking process. The control unit may direct a flow of electricity from the battery to the resistor grid according to a determined voltage or amperage. The control unit may also determine a differential between the state of charge of the battery and the target state of charge and direct electrical charge from the battery to the resistor grid when the differential reaches or exceeds a predetermined value.

In a fourth step 740, the battery is at least partially recharged during a resistive braking event. During this step, the power control unit may direct a flow of electricity from a power source, such as an electric drive motor, to the battery according to a determined voltage or amperage. This step may occur during a downhill haul event, as a non-limiting example.

The method may also include a step 750 of determining the temperature and/or pressure of the ambient air in which the vehicle is operating. Sensor(s) may provide data to the control unit associated with the processor(s), such that this data may be accounted for when the processor(s) determine the target state of charge of battery, as these variable may affect the performance and capacity of the resistor grid system.

Both of the disclosed methods may also include a step of the processor(s) rendering data on a display. In some embodiments, the state of charge of the battery, the target state of charge, and a recommended state of charge of the battery may be rendered by the one or more processors on a display available to an operator of the vehicle, thereby providing additional information to the operator regarding the operating conditions of the resistive braking system. Alternatively or additionally, the temperature and/or the density of the ambient air may also be taken into account by this method and may be rendered by the one or more processors on the display. The display may comprise one or more of a screen, an indicator, a light, a group of lights, an LED display, an LCD display, or another display unit suitable for providing the information to an operator.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various exemplary embodiments is illustrative only. Additionally, any element disclosed in one embodiment may be incorporated or utilized with any other embodiment disclosed herein.

What is claimed is:

1. An electric drive machine comprising:
a battery having a state of charge ranging from a depleted state to a full state;
a resistor grid electrically coupled to the battery; and
a control circuit comprising one or more processors and a memory structured to store instructions that, when executed by the one or more processors, cause the control circuit to:
determine the state of charge of the battery;
determine a target state of charge of the battery according to an anticipated charge event; and
control a flow of electrical current from the battery to the resistor grid, to modify the state of charge of the battery to the target state of charge, prior to the anticipated charge event.

2. The electric drive machine of claim 1, wherein the control circuit is configured to determine a state of charge differential according to two or more of the state of charge, the target state of charge, the depleted state, and the full state.

3. The electric drive machine of claim 2, wherein determining the target state of charge is also according to the full state, the depleted state, or the charge differential.

4. The electric drive machine of claim 2, wherein the state of charge differential is a difference between the state of charge of the battery and the target state of charge of the battery.

5. The electric drive machine of claim 1, further comprising a motor; wherein the resistor grid is in electrical communication with the motor and is configured to provide resistive braking to the electric drive machine.

6. The electric drive machine of claim 5, wherein the motor is configured to provide an electrical charge to the battery during the anticipated charge event.

7. The electric drive machine of claim 6, wherein the anticipated charge event is a downhill haul event.

8. The electric drive machine of claim 7, wherein the control circuit is configured to determine the target state of charge according to an amount of electrical charge that the motor is anticipated to provide during the downhill haul event.

9. The electric drive machine of claim 1, wherein the control circuit controlling the flow of electrical current to the resistor grid causes a reduction in the state of charge of the battery by dissipation of a portion of the electrical current as heat.

10. The electric drive machine of claim 1, wherein determining the state of charge of the battery is performed according to a measured state of charge of the battery, a computational model of the state of charge of the battery, or a combination thereof.

11. The electric drive machine of claim 1, wherein the control circuit is configured to determine the target state of charge in response to: a signal from an operator of the electric drive machine, an elevation of the electric drive machine, an ambient air temperature, an ambient air density, a grade on which the electric drive machine is operated, the cooling load of the resistor grid, or a combination of two or more thereof.

12. A method of controlling an electric drive machine comprising:
  determining, by one or more processors, the state of charge of a battery;
  determining, by the one or more processors, a target state of charge of the battery according to an anticipated charge event;

controlling, by the one or more processors, a flow of electrical current from the battery to a resistor grid, to modify the state of charge of the battery to the target state of charge, prior to the anticipated charge event.

13. The method of claim 12, wherein a motor is in electrical communication with the battery and the resistor grid,
  wherein the anticipated charge event is a downhill haul event, and
  wherein the motor is configured to provide an electrical charge to the battery during the anticipated charge even.

14. The method of claim 13, wherein controlling, by the one or more processors, a flow of electrical current from the battery to a resistor grid reduces the state of charge of the battery prior to the downhill haul event.

15. The method of claim 14, wherein the reduction in the state of charge of the battery is by dissipation of a portion of the electrical current as heat.

16. The method of claim 13, further comprising determining, by the one or more processors, the target state of charge according to an amount of electrical charge that the motor is anticipated to provide during the downhill haul event.

17. A method of operating an electric drive machine, the method comprising:
  measuring an electrical potential of a battery;
  determining, by one or more processors, a state of charge of a battery according to the measured electrical potential of the battery;
  determining, by the one or more processors, a target state of charge of the battery according to an anticipated charge event; and
  discharging a portion of an electrical charge contained by the battery through a resistor grid, thereby reducing the state of charge of the battery to the target state of charge.

18. The method of claim 17, further comprising charging the battery by providing electrical charge to the battery during the downhill haul event.

19. The method of claim 18, further comprising providing resistive braking to the electric drive machine by providing electrical charge to the resistor grid during the downhill haul event.

20. The method of claim 17, wherein the resistor grid converts the discharged electrical charge into heat.

* * * * *